April 15, 1952     E. E. SIVACEK     2,593,355
WINDSHIELD WIPER MECHANISM
Filed April 19, 1947     2 SHEETS—SHEET 1
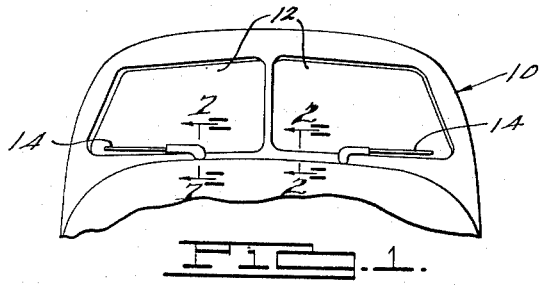
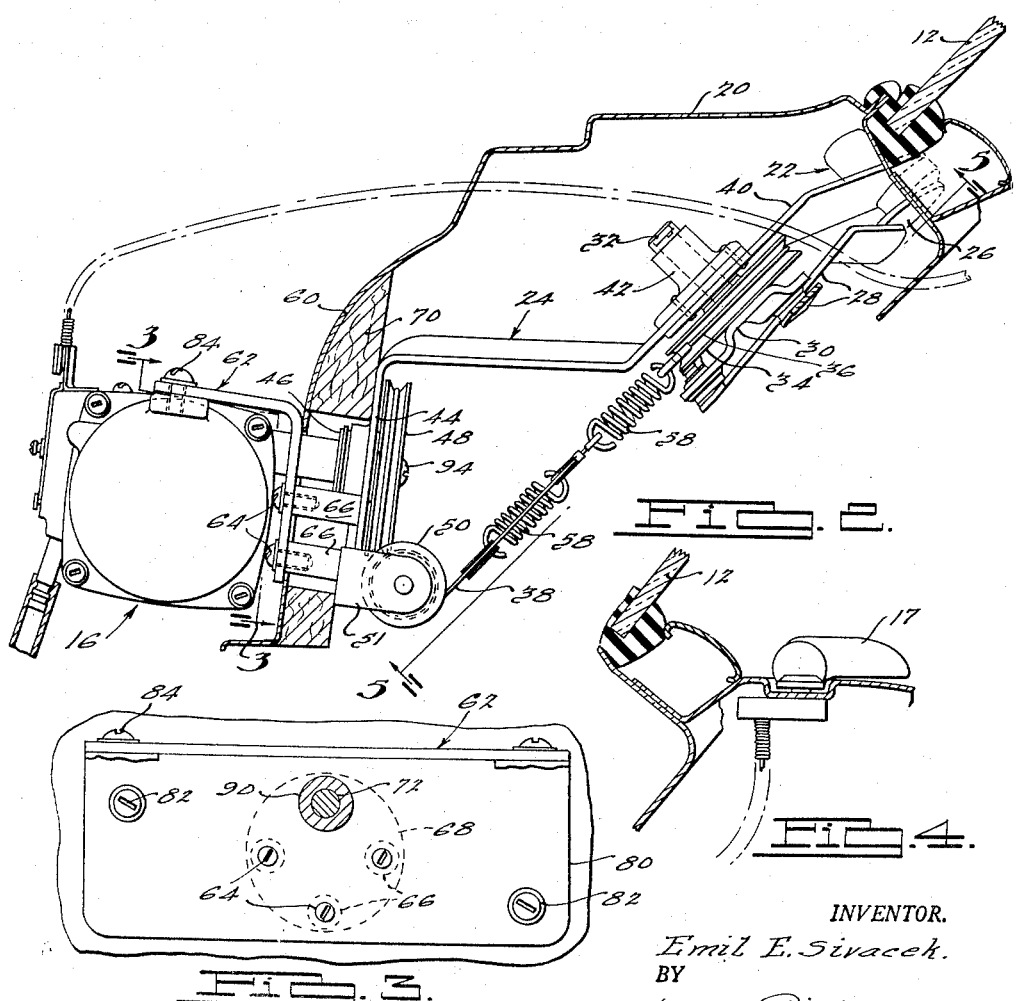
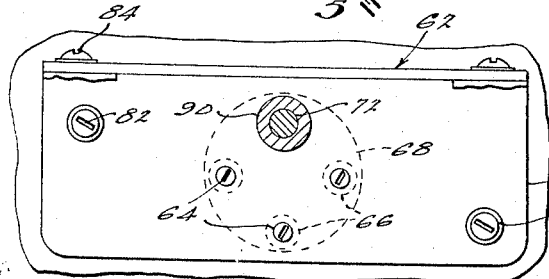
INVENTOR.
Emil E. Sivacek.
BY
Harness, Dickey & Pierce.
ATTORNEYS.

April 15, 1952  E. E. SIVACEK  2,593,355
WINDSHIELD WIPER MECHANISM
Filed April 19, 1947  2 SHEETS—SHEET 2
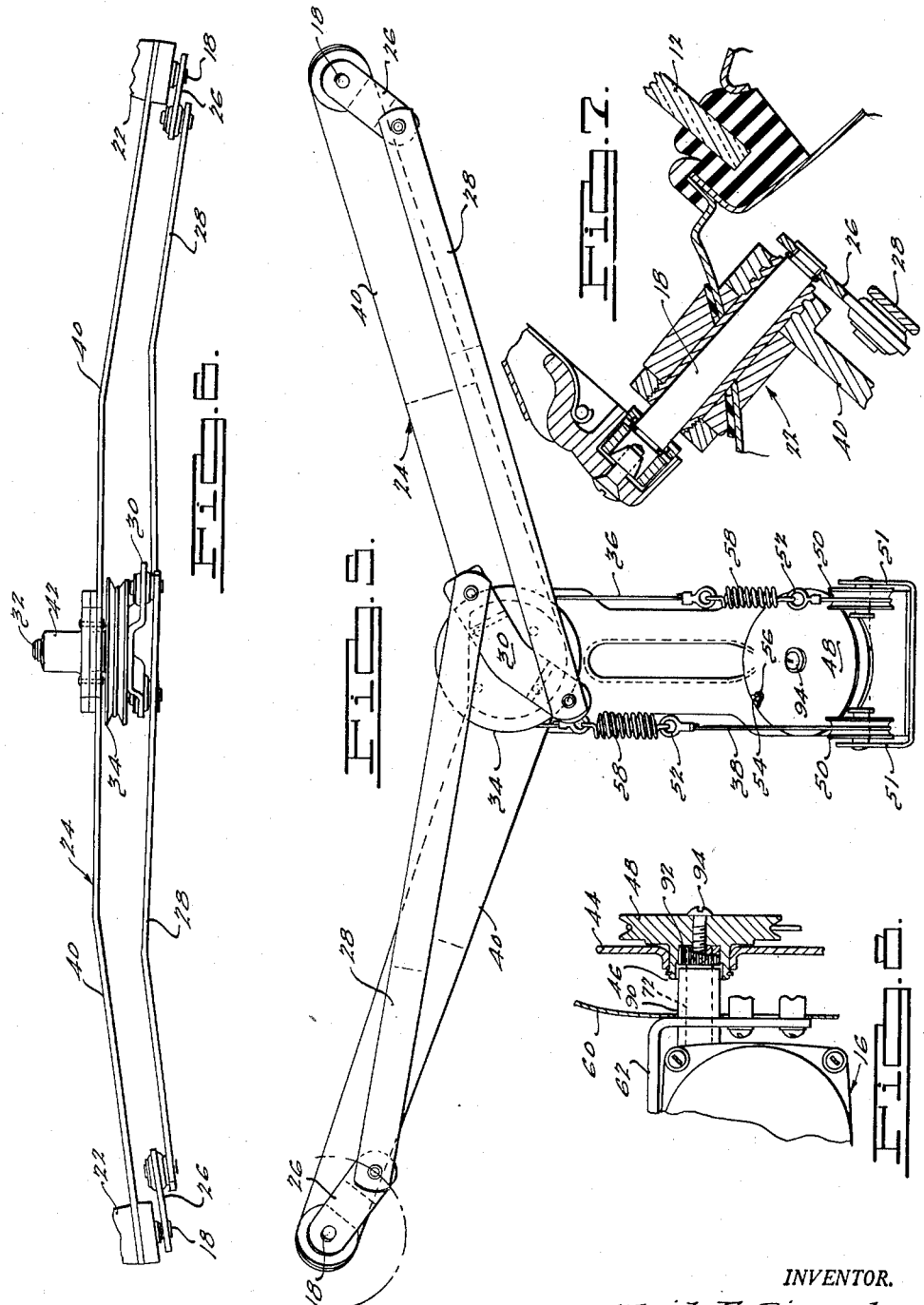
INVENTOR.
Emil E. Sivacek
BY
Harness, Dickey & Pierce
ATTORNEYS.

Patented Apr. 15, 1952

2,593,355

UNITED STATES PATENT OFFICE 2,593,355

WINDSHIELD WIPER MECHANISM

Emil E. Sivacek, Ann Arbor, Mich., assignor to King-Seeley Corporation, Ann Arbor, Mich., a corporation of Michigan Application April 19, 1947, Serial No. 742,566

4 Claims. (Cl. 15—253)

The present invention relates to windshield wiper equipment, and is particularly directed to the provision of an improved driving means connecting the wiper motor and the wiper shafts of a dual wiper system and improved means for mounting the motor, the driving means, and the wiper shafts in an associated vehicle.

Principal objects of the present invention are to provide a system of the above generally indicated type which is simple in arrangement, economical of manufacture and assembly, and which is reliable and efficient in operation; to provide such a system which simplifies and reduces to a minimum the operations involved in attaching or applying the equipment to an associated vehicle; to provide such a system embodying a unitary mounting bracket supporting the wiper shafts and carrying transmission means operatively connected to said shafts and adapted for engagement with and operation by the output shaft of an associated driving motor, said unitary mounting bracket being adapted to be mounted beneath the cowl of the associated vehicle; to provide, in such a system, improved transmission means, improved means for interconnecting the motor and said transmission means, and improved means for supporting the foregoing on the fire wall of an associated vehicle whereby a unitary mounting bracket supporting the driving means may be mounted under the cowl and the motor may be supported in the engine compartment; and to generally improve and simplify the construction and arrangement of windshield wiper systems and mounting arrangements therefor.

With the above as well as other and, in certain cases, more detailed objects in view, which appear in the following description, and in the appended claims, a preferred but illustrative embodiment of the invention is shown in the accompanying drawings, throughout the several views of which corresponding reference characters are used to designate corresponding parts, and in which:

Figure 1 is a fragmentary view in front elevation of a vehicle embodying the dual windshield wiper mechanism of the present invention;

Figure 2 is a view in longitudinal section, taken along the line 2—2 of Figure 1;

Figure 3 is a view in transverse section taken along the line 3—3 of Figure 2;

Figure 4 is a fragmentary view in longitudinal section showing the wiper motor remote control means;

Figure 5 is a view in rear elevation of a portion of the windshield wiper system, taken along the line 5—5 of Figure 2;

Figure 6 is a plan view of a portion of the structure shown in Figure 5;

Figure 7 is a view in longitudinal section taken along the line 7—7 of Figure 1; and Figure 8 is a fragmentary view partly in elevation and partly in section showing the connection of the motor output shaft to the power transmission means.

It will be appreciated from a complete understanding of the present invention that, in a generic sense, the improvements thereof may be embodied in windshield wiper systems of various different designs, and arranged for use in connection with various different vehicles. A preferred application of this invention is in connection with so-called cowl mounted dual wiper systems, wherein, in order, among other things, to reduce the noise level within the passenger compartment of the vehicle, the driving motor for the wipers is located within the engine compartment. In an illustrative but not in a limiting sense, except is so far as is defined in the claims, the invention is so disclosed herein.

Referring to the drawings, the illustrative vehicle 10, having a usually inclined V-type windshield, comprising glass sections 12, is provided with a windshield wiper system comprising generally a pair of identical wipers 14, which are adapted to be oscillated through arcs, of similar size and location with respect to the associated glass sections, by means of a driving motor 16, the operation of which is controlled by a suitable remote control 17 conveniently located in the interior of the vehicle 10. In their normal or parked positions, shown in Figure 1, the two wipers 14 lie in substantially horizontal positions immediately adjacent the lower margins of the associated glass sections.

Each wiper 14 is releasably connected, as described below, to an oscillatory wiper shaft 18, the two shafts 18 being supported in predetermined relation to each other and to the cowl 20 of the vehicle 10, by means of swivels 22 and the unitary interconnecting bracket 24. Each wiper shaft 18 carries a crank 26, which is pivotally connected, by means of an associated link 28, to the corresponding end of a cross arm 30, which, in the illustrated embodiment, is drivingly connected to a shaft 32, which also drivingly carries a grooved pulley 34, over which is trained an endless cable composed of two sections 36 and 38.

The bracket 24 is generally Y-shaped, comprising a pair of upwardly and outwardly directed arms 40, which carry the swivels 22 rigidly fixed thereto and a generally forwardly and downwardly extending body portion. At the rear end of this body portion a bearing member 42 is rigidly connected to the bracket 24 and rotatably supports the shaft 32. Adjacent its forward end the body portion of bracket 24 is downwardly turned to provide a generally vertical forward end portion 44 which provides a journal for the forwardly extending hub 46 of a second pulley 48. The lower cable section 38 is trained over the pulley 48 and is also trained over a pair of idler pulleys 50 which are mounted on wings 51 formed on the bracket portion 44 below the pulley 48. Preferably and as shown, slippage between the pulley 48 and the cable section 38 is prevented by a locking member 54 which is secured within a peripheral depression 56 in the pulley 48, the cable section 38 being received between the locking member and the face of the pulley. A similar expedient may be and preferably is employed to prevent slippage between the cable section 36 and the previously mentioned pulley 34.

The free ends of the cable sections 36 and 38 are provided with eyes 52 and the respective ends of the two cable sections are detachably hooked together by means of a pair of coil springs 58, the opposite ends of which are secured to the cooperating eyes 52.

The wiper motor 16 may be of any desired type, but, by way of illustration, is illustrated as being of the double piston, suction operated type, certain features whereof are described and claimed in Bell Patent No. 2,354,189, granted July 25, 1944 and in the copending application of the present applicant Serial No. 610,557, filed August 13, 1945. As shown, the motor is disposed forwardly of the usual fire wall 60 and has a mounting connection with the unitary mounting bracket 24. The term mounting connection as used herein includes any connection which may serve to either align the motor and the pulley 48 or to partially or wholly support the motor 16 on the bracket 24. Preferably, however, the motor 16 is supported on the fire wall 60. In the preferred embodiment illustrated the motor is mounted on a motor bracket 62 which is secured adjacent its opposite ends to the fire wall 60 by screws 82. The forward end portion 44 of the unitary mounting bracket 24 is anchored to the motor bracket 62 by screws 64 extending through the bracket 62 and into posts 66 mounted on the portion 44 of the unitary mounting bracket 24. The posts 66 extend forwardly through an enlarged aperture 68 in the fire wall 60 and its associated insulation 70. As the screws 64 are tightened, the fire wall and the associated insulation are clamped between the unitary mounting bracket portion 44 and the motor bracket 62.

Referring further to Figures 1 and 3, the motor bracket 62 includes a generally vertically disposed transversely extending portion 80, which is secured to the fire wall 60 by the screws 82. Generally centrally of the portion 80 the bracket has a plurality of apertures formed therein adapted to register with the posts 66 extending forwardly through the fire wall, and receive the screws 64 which secure the posts to the bracket 62. The motor 16 is secured to a forwardly extending flange of the bracket 62, by the screws 84.

It will be noted that the entire assembly illustrated in Figure 5 and comprising the unitary mounting bracket 24, the swivels 22, the shafts 18, the cranks 26, the links 28, the cross arm 30, the pulleys 34 and 48, the idler pulleys 50, and the endless cable trained about the pulleys, may be and preferably is manufactured as a subassembly, which can be bodily applied to the associated vehicle by assembling the swivels 22 in their associated cowl openings. Additional support for this subassembly is provided by the above described connection between bracket 62 and bracket portion 44 and the fire wall 60.

The oscillatory output shaft 72 of the motor 16 is drivingly connected as hereinafter described, to the pulley 48 which in turn transmits an oscillatory movement through the flexible cable to the pulley 34 and the cross arm 30. This oscillatory movement of the cross arm 30, acting through the links 28 and the crank 26 produces similar but relatively opposite oscillatory movements of the wiper shafts 18. It will be apparent from the above that the relative amplitudes of the above described oscillatory movements are dependent upon, and may be controlled by, varying the relative diameters of the pulleys 48 and 34, the length of the cross arm 30 and the proportions of the links 28 and cranks 26.

More particularly, the motor shaft 72 is journaled in a rearwardly extending sleeve 90 carried by the motor and is provided at its outer end with a generally cylindrical drum 92, fixed thereto for rotation therewith, and the outer surface of which is longitudinally serrated to provide a driving engagement with a correspondingly serrated socket formed centrally of the hub 46 on the pulley 48, and into which the motor shaft extends. A screw 94 extends axially through the pulley 48 and axially into the inner end of the motor shaft 72 thereby holding the drum 92 in driving engagement with the pulley 48.

It is an important feature of the present invention that only a minimum of operations are required in installing the windshield wiper system thereof in an associated vehicle, and that these operations may be simply and readily accomplished. The upwardly extending arms 40 of the unitary mounting bracket 24 are attached to the associated vehicle when the swivels 22, which they carry, are assembled in their associated cowl openings. The motor bracket 62 is mounted on the fire wall 60 by means of the screws 82 and the lower end of the unitary mounting bracket 24 may then be connected thereto by applying the screws 64. The assembly is then completed by placing the motor 16 in position with its output shaft extending through the bracket 62 and fire wall 60 and axially into the pulley 48, and applying the screws 84 which hold the motor to the bracket 62, and the screw 94 which serves to maintain the above described driving engagement between the drum 92 and the pulley 48.

Although only one specific embodiment of the invention has been illustrated and described in detail, it will be readily apparent to those skilled in the art that numerous modifications and changes in the form, number, and arrangements of parts may be made without departing from the spirit of the invention and the scope of the appended claims.

What is claimed is:

1. A power transmission assembly for a vehicle windshield wiper mechanism including spaced wipers, and a motor mounted in the engine compartment of the vehicle adjacent an aperture in the fire wall of said vehicle, said assembly comprising spaced wiper actuating shafts adapted to be connected to said wipers, a first drive member common to said shafts, transmission means operatively coupling said member and said shafts, a second drive member common to said shafts and adapted to be connected through said aperture to said motor, additional transmission means operatively connecting said members, unitary mounting means adapted to be secured to said vehicle in predetermined relation to said windshield, said shafts, members and transmission means being mounted on said mounting means in predetermined relation to each other to form a unitary assembly, and means carried by said second member operable to connect said second member to and disconnect said second member from said motor without interfering with the mounting of said second member on said unitary mounting means.

2. A power transmission assembly as defined in claim 1 wherein said second drive member is mounted on said unitary mounting means remote from said first drive member and wherein said additional transmission means comprises endless flexible means operatively connecting said members.

3. A power transmission assembly as defined in claim 1 wherein said first and second members are pulley wheels.

4. A power transmission assembly as defined in claim 1 wherein said first and second drive members are pulley wheels and wherein said additional transmission means comprises endless flexible means trained over and operatively connecting said pulley wheels.

EMIL E. SIVACEK.

REFERENCES CITED

The following references are of record in the file of this patent:

UNITED STATES PATENTS

| Number | Name | Date |
| --- | --- | --- |
| 2,100,188 | Hansmann | Nov. 23, 1937 |
| 2,357,152 | Whitted | Aug. 29, 1944 |

FOREIGN PATENTS

| Number | Country | Date |
| --- | --- | --- |
| 408,314 | Great Britain | Apr. 9, 1934 |
| 422,217 | Great Britain | Jan. 8, 1935 |